May 21, 1946.  R. G. COX  2,400,686
NIPPLE INSERTING TOOL
Filed April 15, 1943  2 Sheets-Sheet 1

Inventor
ROBERT G. COX
By Beaman & Langford
Attorneys

May 21, 1946.  R. G. COX  2,400,686
NIPPLE INSERTING TOOL
Filed April 15, 1943  2 Sheets-Sheet 2

Inventor
ROBERT G. COX
By Beaman + Langford
Attorneys

Patented May 21, 1946

2,400,686

UNITED STATES PATENT OFFICE 2,400,686

NIPPLE INSERTING TOOL

Robert G. Cox, Jackson, Mich., assignor to Michigan Patents Corporation, Jackson, Mich., a corporation of Michigan Application April 15, 1943, Serial No. 483,097

1 Claim. (Cl. 81—72)

The present invention relates to improvements in internal wrenches, being particularly designed for attaching to hose union or coupling members of the type comprising a hose ferrule, and a nipple for insertion in the hose, the nipple having a screw connection with the ferrule and having an internal diameter equal to that of the hose. Many other fields of application will be apparent.

In hose union members of the kind mentioned above, it is desirable to keep the internal diameter of the nipple equal to the internal diameter of the hose, but this is difficult because of the difficulty of inserting such a nipple in the hose and at the same time providing a connection which will not separate or cause the hose to break under excessive stress.

The invention relates to a tool adapted for use with hose union members of the kind above described, which enables the nipple to be inserted in the hose in a simple and secure manner. The tool comprises a mandrel which has eccentrically disposed portions which may be actuated to cause the mandrel to internally grip the nipple so that the same may be inserted in the hose.

An object of the present invention is to provide a tool of the character described comprising a removable mandrel which may be caused to internally grip a nipple or other external part.

Another object of the invention is to provide a mandrel of the character described having eccentrically arranged parts which may be actuated to internally grip an external part into which they are inserted.

Figure 1:
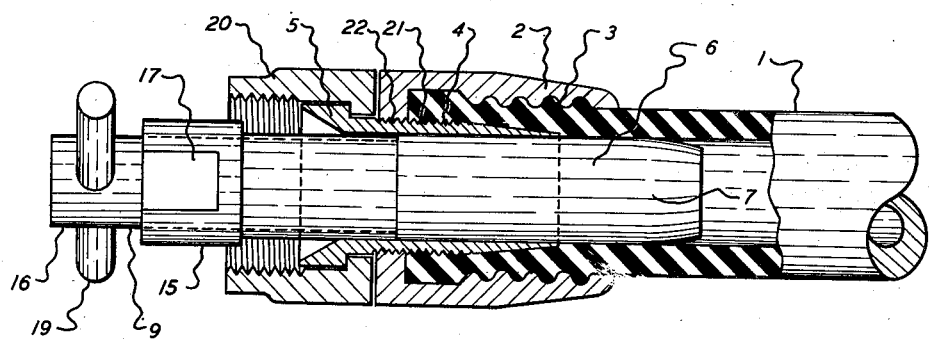
Figure 2:
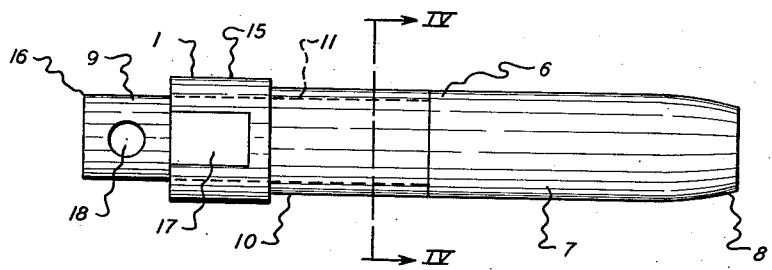
Figure 3:
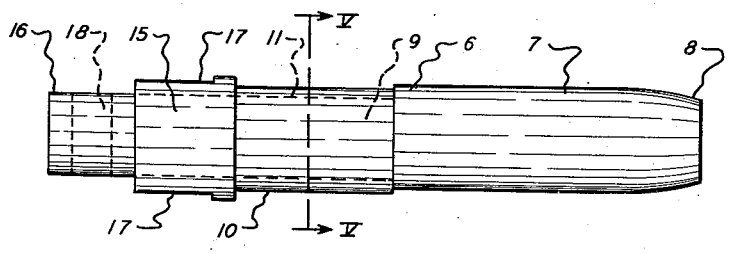
Figures 4, 5:
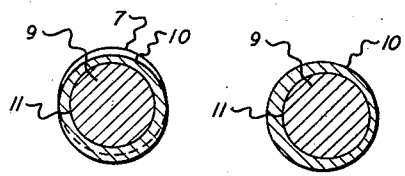
Figure 6:
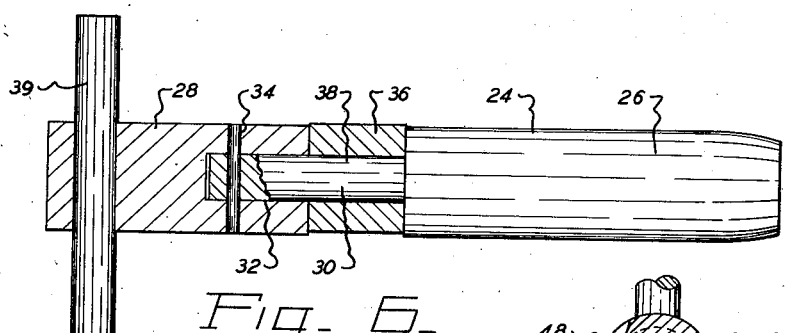
Figure 9:
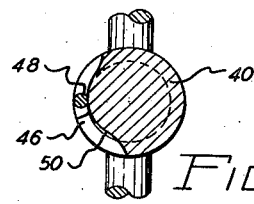
Figure 7:
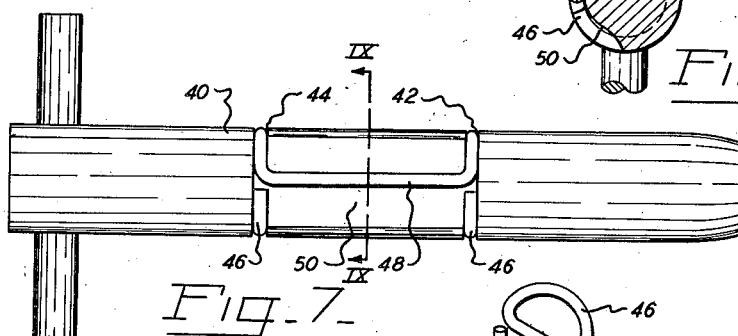
Figure 8:
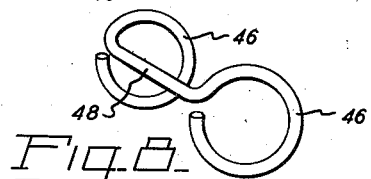
Figure 10:
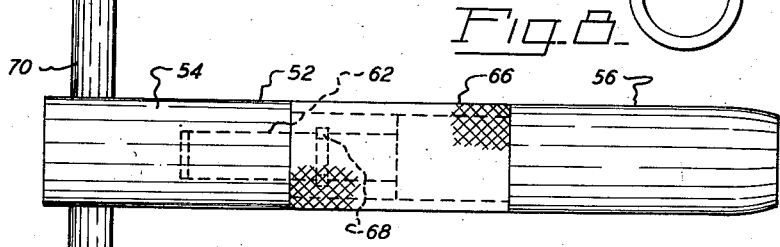
Figure 11:
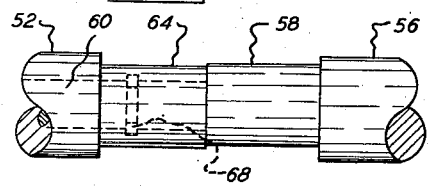
Figure 12:
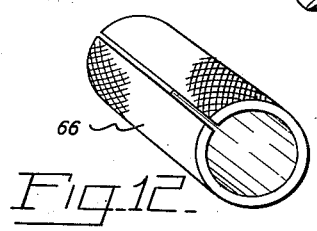

These and other objects residing in the arrangement, combination and construction of the parts will be apparent when taken with the accompanying drawings, in which several forms of the invention are shown, and in which Fig. 1 is a vertical section of a hose union or coupling disclosing the tool according to the present invention in nipple inserting relation, Fig. 2 is an elevation of the tool according to the present invention in one position thereof, Fig. 3 is a view corresponding to Fig. 2 showing the parts of the tool in another position, Fig. 4 is a section on the line IV—IV of Fig. 2, Fig. 5 is a section on the line V—V of Fig. 3, Fig. 6 is a vertical section of another form of the invention, Fig. 7 is a side elevation of a further form of the invention, Fig. 8 is a perspective view of the detent, Fig. 9 is a cross section taken on line IX—IX of Fig. 7, Fig. 10 is a view similar to Fig. 7 of a still further form of the invention, Fig. 11 is a fragmentary view of Fig. 10 with the split ring removed, and Fig. 12 is a perspective view of the split ring.

Referring particularly to the drawings, the reference character 1 indicates a hose, usually of rubber or the like although it need not be limited to such material. The hose has provided over one end thereof a ferrule 2, which preferably has the inner end thereof ribbed or threaded with corrugations 3 for the purpose of providing a secure grip on the hose. A nipple 4 is shown inserted in the end of the hose 1. In the position shown the nipple 4 compresses the walls of the hose 1 outwardly into gripping engagement with the internal walls of the ferrule 2. Due to the fact that the internal passage through the nipple 4 is of the same diameter as the internal passage through the hose 1, the compression resulting from the insertion of the nipple 4 into the outer end of the hose 1 is considerable.

Great difficulty is normally encountered in inserting the nipple 4 into the end of the hose 1 after the ferrule 2 has been disposed thereon, without marring the exterior surfaces of the head portion 5 of the nipple 4. According to the present invention, the nipple 4 is internally gripped by a mandrel 6.

The mandrel 6 comprises a nose portion 7 which has a tapered outer end 8. At the opposite end of the mandrel 6 there projects a pin 9 which is eccentric with respect to the nose 7, as shown particularly in Fig. 4. Disposed about the pin 9 is a sleeve 10 having an eccentric bore 11 therethrough. The sleeve 10 snugly fits over the pin 9, and the eccentricity of the bore 11 thereof is the same as that of the pin 9 with respect to the nose 7. The same eccentricities result in the sleeve 10 and nose 7, which have the same external diameters, being in axial alignment in one position thereof, this position being shown in Figs. 2 and 4. However, should the sleeve 10 be rotated slightly with respect to the pin 9, the sleeve 10 will be laterally displaced with respect to the nose 7. In Figs. 3 and 5 the sleeve 10 is rotated 180 degrees with respect to the nose 7 from the respective positions disclosed in Fig. 2. In this relative position of the sleeve 10 and the nose 7, the parts have their maximum relative lateral displacement.

The nose 7 has a sufficient length with respect to the length of the nipple 4 so that when in operative association therewith the tapered end 8 projects from the entering end of the nipple. Also the sizes of the parts are so designed that the sleeve 11 and the pin 9 have tool engaging portions 15 and 16 respectively, which project from the opposite end of the nipple 4. The tool engaging portion 15 takes the form of a nut having flats 17 for being gripped by a wrench and the tool engaging portion 16 is provided with a bore 18 for receiving a rod 19 therethrough.

When it is desired to assemble the nipple 4 in the tube 1, the mandrel 6 is inserted into the nipple 4, as shown particularly in Fig. 1, and the tool engaging portions 15 and 16 are oppositely relatively rotated to move the sleeve 10 laterally with respect to the nose 7 to cause the mandrel 6 to internally grip the sleeve 4. The eccentricity of the sleeve 10 and the pin 9 should be such with respect to the manufacturing tolerances of the nipple 4 and of the mandrel 6 as to cause a wedging and locking action of the mandrel 6 with respect to the nipple 4.

When the mandrel 6 has been clamped to the nipple 4 and the coupling nut 20 slipped over the nipple 4, the tapered end 8 of the nose 7 is inserted into the tube 1 over the end of which the ferrule 2 has been disposed. The tapered portion 8 of the nose 7 facilitates the entry of the nose 7 into the hose 1 and leads the way for the nipple 4. The nipple 4 and the ferrule 2 are provided with complementary threaded portions 21 and 22 respectively. When the nipple 4 has been inserted into the end of the hose sufficiently far for the threads 21 to engage with the threads 22, the nipple 4 may be rotated preferably by means of the rod 19 passing through the outer end of the pin 9. When the nipple 4 has been threaded into the ferrule 2 as far as it will go, the tool engaging portions 15 and 16 of the sleeve 10 and pin 9 respectively are relatively rotated to unclamp the mandrel 6 from the interior of the nipple 4 and the mandrel 6 is withdrawn from the nipple 4.

It will be understood that during the assembling of the nipple 4 with respect to the hose 1 and ferrule 2, as above described, the portion of the hose 1 within the ferrule 2 is squeezed or compressed into gripping engagement with the interior of the ferrule 2 so as to resist the blowing out of the nipple 4 from the hose 1 upon the hose being subjected to high pressures. It will be further understood that various arrangements might be devised for the purpose of employing the eccentric relation of the sleeve 10 to the nose 7 to clamp against the interior of the nipple 4. Furthermore, it is to be understood that the tool as such constitutes the invention, and accordingly its use is not limited to any particular form of nipple or other external part.

In Figs. 6 through 12 are shown several modified forms of the invention. In Fig. 6 the main body of the tool 24 consists of portions 26 and 28 having a common axis with a slightly eccentric shank 30 fitted in a similarly eccentric bore 32. A pin 34 holds the portions 26 and 28 in assembled relation. Mounted upon the shank 30 is a knurled cylindrical collar 36 having a slightly eccentric bore 38. The diameter of the collar 36 is slightly in excess of the diameter of the parts 26 and 28 with the result that the eccentric mounting thereof upon the shank 30 will produce relative movement between the collar 36 and the main body of the tool 24 when the latter is initially rotated within the nipple or other cylindrical part by the handle 38. This relative movement following initial rotation is arrested by the wedging action produced by the eccentricity of the parts and thereafter the collar 36 will function as a wrench to grip the interior of the part into which the tool is inserted and will rotate as a unit with the main body 24 of the tool.

In the modifications shown in Figs. 7, 8 and 9, the tool 40 has grooves 42 and 44 machined in the surface thereof to receive the loops 46 of a locking detent. The loops 46 are connected by a bar portion 48 which is adapted to ride upon a cam surface 50 extending between the grooves 42 and 44. Friction between a bore into which the tool 40 may be inserted and closely fitted will tend to hold the bar 48 against rotation. Upon rotation of the tool 40 the bar 48 will ride up the cam 50 into a wedging position, clutching the tool 40 to the interior of the bore in which it is inserted. Rotary movement of the tool in the opposite direction will result in the bar 48 moving along the cam surface 15 in the opposite direction into a releasing position. It will be understood that the detent shown in Fig. 8 is capable of partial rotary movement in the grooves 42 and 44.

In the form of the invention shown in Figs. 10, 11 and 12 the tool 52 consists of two parts 54 and 56. The part 56 has a cylindrical portion 58 slightly eccentric to the axis of the tool and a concentric shaft portion 60 which extends into a concentric bore 62 machined in the part 54. The part 54 has an eccentric portion 64 complementary to the eccentric portion 58. The split sleeve 66, shown in Fig. 12, is preferably of spring metal having a knurled outer surface. In its unstressed position the outer diameter of the sleeve 66 is slightly greater than the diameter of the parts 54 and 56. The eccentric portions 58 and 64 define a recess in which the sleeve 66 is confined as shown in Fig. 10. With the parts 54 and 56 disassembled, the sleeve 66 is inserted over the telescoping ends thereof and the shaft portion 60 is then inserted in the bore 62 with the parts being held in assembled relation by the spring and groove assembly indicated at 68. When the tool 52 is inserted in the nipple as shown in Fig. 1, the forward end 56 will experience resistance to rotation. If rotary movement is then imparted to the tool 52 through the handle 70 relative rotation between the parts 54 and 56 will result. This relative rotation will produce an expanding action upon the spring sleeve 66 through relative displacement of the eccentric portions 58 and 64, clutching the tool 52 firmly to the inner wall of the nipple.

Having thus described my invention what I desire to secure by Letters Patent and claim is:

A nipple holding and inserting tool of the character described for assembling a nipple into a flexible hose comprising a nipple feeding mandrel adapted to be inserted into a nipple, said mandrel having a nose portion adapted to have a part thereof project beyond one end of the nipple when in operative relation therewith, said mandrel having a pin extending axially from the end thereof opposite said projecting end, said pin being eccentric with said nose portion, an eccentric sleeve telescoped on said pin, said sleeve and pin each having portions projecting from the other end of said nipple when in operative relation therewith and having means for holding one and rotating the other, said pin, sleeve, and nose portion being arranged so that in one relative rotative position thereof said sleeve and nose portion are axially aligned, and in another relative rotative position thereof are out of axial alignment, for clamping the mandrel to the nipple when so laterally displaced said projecting portions extending one beyond the other.

ROBERT G. COX.